US009444823B2

(12) United States Patent
Narayanan et al.

(10) Patent No.: US 9,444,823 B2
(45) Date of Patent: Sep. 13, 2016

(54) METHOD AND APPARATUS FOR PROVIDING NETWORK COMMUNICATION ASSOCIATION INFORMATION TO APPLICATIONS AND SERVICES

(75) Inventors: Vidya Narayanan, San Diego, CA (US); Lakshminath Reddy Dondeti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 1558 days.

(21) Appl. No.: 12/343,988

(22) Filed: Dec. 24, 2008

(65) Prior Publication Data

US 2010/0162348 A1 Jun. 24, 2010

(51) Int. Cl.
*H04L 29/06* (2006.01)
*H04L 29/08* (2006.01)

(52) U.S. Cl.
CPC .......... *H04L 63/105* (2013.01); *H04L 63/205* (2013.01); *H04L 67/14* (2013.01); *H04L 63/102* (2013.01)

(58) Field of Classification Search
CPC .... H04L 63/102; H04L 67/14; H04L 63/205
USPC ...................... 726/1; 713/151–152
See application file for complete search history.

(56) References Cited

U.S. PATENT DOCUMENTS

| 7,333,956 B2 | 2/2008 | Malcolm |
| 7,350,233 B1 | 3/2008 | Lee et al. |
| 7,363,379 B2 * | 4/2008 | Tejaswini et al. ............ 709/227 |
| 7,545,941 B2 * | 6/2009 | Sovio et al. .................. 380/270 |
| 8,838,600 B2 * | 9/2014 | Mariotti et al. .............. 707/737 |
| 2001/0047474 A1 * | 11/2001 | Takagi et al. ................. 713/151 |
| 2004/0210766 A1 * | 10/2004 | Kroselberg .................... 713/201 |

(Continued)

FOREIGN PATENT DOCUMENTS

| EP | 1324541 A2 | 7/2003 |
| EP | 1569411 A1 | 8/2005 |
| JP | 2008543140 A | 11/2008 |

OTHER PUBLICATIONS

Hondo et al, Securing Web Services, IBM Systems Journal, 2002, vol. 41, No. 2, pp. 228-241.*

(Continued)

*Primary Examiner* — Christopher Brown
*Assistant Examiner* — Jenise Jackson
(74) *Attorney, Agent, or Firm* — Won Tae C. Kim

(57) ABSTRACT

A system and method are provided that allow an application on a first terminal to inquire about available network communication associations that it can use to send data to another terminal, thereby avoiding the establishment of a new network communication association with the other terminal. A security information module may serve to collect and/or store information about available network communication associations between the first terminal and another terminal across different layers. The security information module may also assess a trust level for the network communication associations based on security mechanisms used to establish each association and/or past experience information reported for these network communication associations. Upon receiving a request for available network communication associations, the security information module provides this to the requesting application which can use it to establish communications with a corresponding application on the other terminal.

30 Claims, 10 Drawing Sheets

(56) References Cited

U.S. PATENT DOCUMENTS

| | | | |
|---|---|---|---|
| 2004/0268124 A1 | 12/2004 | Narayanan | |
| 2005/0059379 A1* | 3/2005 | Sovio et al. | 455/411 |
| 2005/0102514 A1* | 5/2005 | Bergenwall et al. | 713/168 |
| 2006/0059564 A1* | 3/2006 | Tan et al. | 726/27 |
| 2007/0210961 A1* | 9/2007 | Romijn | G01S 5/0289 342/464 |
| 2008/0031155 A1* | 2/2008 | Korus et al. | 370/254 |
| 2008/0086609 A1* | 4/2008 | Lesser et al. | 711/162 |
| 2008/0140835 A1* | 6/2008 | Bradley et al. | 709/225 |
| 2008/0228300 A1* | 9/2008 | Tagawa et al. | 700/94 |
| 2009/0109986 A1* | 4/2009 | Zhao et al. | 370/401 |
| 2009/0144401 A1* | 6/2009 | Kawai | 709/220 |
| 2009/0207855 A1* | 8/2009 | Watanabe | 370/466 |
| 2010/0161986 A1* | 6/2010 | Bucker et al. | 713/169 |

OTHER PUBLICATIONS

Pirzada et al, Reliable Link Reversal Routing for Mobile Ad-Hoc Wireless Networks, IEEE, 2005, pp. 234-239.*

Abd-El-Barr et al, Wireless Sensor Networks—Part I: Topology and Design Issues, 2005, IEEE, pp. 1165-1168.*

Miller e tal, Collecting Network Status Information for Network-Aware Applications, 2000, IEEE, pp. 641-650.*

International Search Report & Written Opinion—PCT/US2009/069119, International Search Authority—European Patent Office—Apr. 1, 2010.

Taiwan Search Report—TW098144556—TIPO—Apr. 9, 2013.

* cited by examiner

METHOD AND APPARATUS FOR PROVIDING NETWORK COMMUNICATION ASSOCIATION INFORMATION TO APPLICATIONS AND SERVICES

BACKGROUND

1. Field

At least one feature relates to secure communications between devices in a communication network and more specifically to collection and sharing of available network communication associations across different layers and applications.

2. Background

Applications, such as electronic mail (email), on either wired or wireless devices in a communication network are currently unaware of the strength of the underlying authentication mechanism that was used to create security associations in the network. As a result, each application manages its own security when communicating with another device. For instance, an application may know that a Transport Layer Security (TLS) or Internet Protocol Security (IPSec) channel exists, but not how the channel was established. The channel may have been established, for example, via Unauthenticated Diffie-Hellman (DH), Pretty Good Privacy (PGP) based authentication, Pre-Shared Key (PSK) based authentication or Public Key Infrastructure (PKI) based authentication, but the application is unaware of the type of authentication used to establish the channel.

In the Open System Interconnection (OSI) layered communications and computer network protocol design, each layer may establish its own secured or unsecured association or channel. For example, a first OSI layer may establish a secured or unsecured communication channel with another device. Similarly, a second OSI layer, for instance, a Media Access Control (MAC) layer, an Internet Protocol (IP) layer, and/or an application layer, may protect communications between two devices using its own secure channel. An application operating on a layer of a device is typically unaware of the security or authentication characteristics of a first layer channels or associations and, therefore, has to establish its own secure channel or association.

Even if the application knew of a secure association or channel on another layer, as discussed above, it does not know what type or strength of authentication was used to create the secure association or channel. If the authentication level is not clear, maintaining a minimum level of authentication at each layer is impossible. As a result, an application has to establish its own Internet Protocol (IP) connectivity, i.e. IP layer encryption, even though a first layer communication association or channel is available and could be employed for the same purpose.

Additionally, even if the application were knowledgeable of the type of authentication used to establish a security association at a first layer, this alone may be insufficient to determine the actual quality of the security association. Although authentication may prove that an entity is who it claims to be, it cannot provide assurance on the reliability or quality of the service available through the entity. Currently, applications looking for such assurance have no means of obtaining it.

In view of the above, a system and method is desirable for providing information on first layer network communication associations to first or second layer applications to facilitate secure communications over the first layer network communication associations, thereby avoiding the establishment of an additional first network communication association or the use of a second layer network communication association. The information may include the established network communication associations, type of authentication used and the reliability or level of trust of the security association.

SUMMARY

One feature provides a method operational on a transmitting terminal that allows an application to utilize pre-established network communication associations, at the same or different layers, to transfer data to a receiving terminal, thereby avoiding the establishment of a new network communication association. As a result, overhead is minimized as overhead may not be wasted in establishing the new network communication association that may have already been established. To accomplish this, a security information module (e.g., hardware, software, or combination thereof) provides an interface through which information for one or more network communication associations for one or more layers is collected and distributed to applications. In one example, the one or more network communication associations may correspond to one or more layers of an Open Systems Interconnection (OSI) module communication system, where the one or more layers may include at least one of an application layer, a network layer, a data link layer and a physical layer.

A level of trust may be assessed and/or stored for each of the one or more network communication associations. Additionally, information from applications regarding previous experiences with one or more receiving terminals may be collected and provided to other applications. A level of trust may be assessed for each such receiving terminal based on the collected information. The level of trust may be based on previous experiences with a corresponding receiving terminal and type of authentication used to create the layer network communication association to the corresponding receiving terminal. A set of policies may also be identified to be used in selecting a network communication association through which to send the data, wherein the set of policies is based on user preferences.

A request may be received from a requesting application for information about available layer network communication associations. In response, security information for at least one network communication association may be provided to the requesting application to allow the requesting application to select a network communication association to send data to a receiving terminal, thereby avoiding the establishment of a new network communication association with the receiving terminal. The collected information may be stored in a security information module for later retrieval and selection of a network communication association on which to send the data to an application on the receiving terminal. The security information provided may include a level of strength for the network communication associations. A network communication association may be selected on which the requesting application can send the data to the receiving terminal over a network. The security information of the network communication associations may include at least one of: a method used to secure the first layer network communication association, a method used to authenticate the first layer network communication association, and a prior history between the transmitting terminal and the receiving terminal with which the network communication associations are established.

The selected network communication association is selected from the one or more network communication associations if a security level of at least one of the one or more network communication association meets a desired security level for data transmissions by the requesting application. Alternatively, a new network communication association may be established which the requesting application can use to send the data to the receiving terminal if security levels of the one or more network communication associations fail to meet a desired security level. Upon selecting a network communication association, the receiving terminal may be notified of the network communication association on which to receive data being sent.

In one example, the requesting application may operate on a first layer and the selected network communication association may operate on a different second layer. The first layer may be a higher layer than the second layer. In another example, the requesting application may operate on a first layer and the selected network communication association may operate on the same first layer.

According another implementation, an access terminal is provided comprising a communication interface and a processing circuit. The processing interface may be adapted for communication with a receiving terminal. The processing circuit may be configured to: (1) provide an interface through which information for one or more network communication associations for one or more layers is collected and distributed to applications, (2) receive a request from the requesting application for information about available layer network communication associations, (3) select a network communication association on which to send the data to the receiving terminal over a network, and/or (4) provide security information for at least one network communication association to a requesting application to allow the requesting application to select a network communication association to send data to a receiving terminal, thereby avoiding the establishment of a new network communication association with the receiving terminal. In one example, the selected network communication association may be selected from the one or more network communication associations if a security level of at least one of the one or more network communication association meets a desired security level for data transmissions by the requesting application. In some implementations, the requesting application may operate on a first layer of a hierarchical protocol architecture and the selected network communication association operates on a second layer of the hierarchical protocol architecture. Alternatively, the requesting application may operate on a first layer and the selected network communication association operates on the same first layer of a hierarchical protocol architecture.

In some implementations, the processing circuit may be further configured to establish a new network communication association and using it to send the data to the receiving terminal if security levels of the one or more network communication associations fail to meet a desired security level.

According to another feature, the processing circuit may be further configured to: (1) assess a level of trust for each of the one or more network communication associations; and/or (2) store the level of trust for each of the one or more network communication associations.

According to yet another feature, the processing circuit may be further configured to: (1) collect information from applications regarding previous experiences with one or more receiving terminals, (2) assess a level of trust for each such receiving terminal based on the collected information, and/or (3) provide the information of the one or more receiving terminals to other applications.

The access terminal may also include a storage device coupled to the processing circuit and configured to store the collected information in a security information module for later retrieval and selection of a network communication association on which to send the data to an application on the receiving terminal.

In various examples, one or more of the features described herein may be implemented in hardware (e.g., one or more processors, circuits, chips, etc.), software, and/or a combination thereof.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
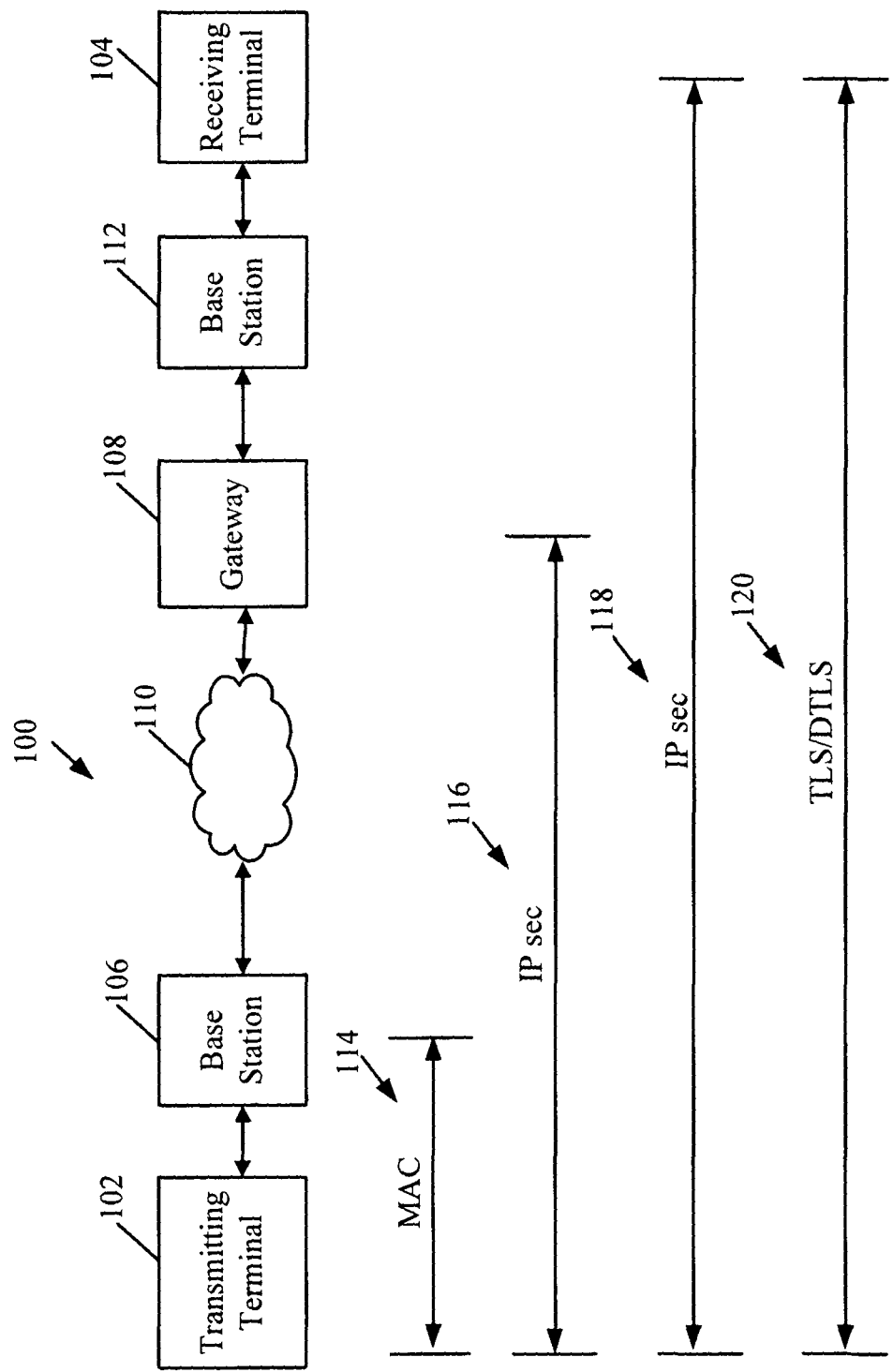
FIG. 1 is a block diagram of a communication network illustrating first layer network communication associations established during communications between a transmitting terminal and a receiving terminal.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

As used herein, the term "terminal" may include some or all the functionality of, a user equipment (UE), a wireless or wired communication device, a network device, a personal communication device, mobile device, and/or a mobile station. The term "network communication association"

may include a link or channel over a network that is established between applications or services of two different terminals.

Overview

A system and method are provided that allow an application on a first terminal to inquire about available network communication associations that it can use to send data to another terminal, thereby avoiding the establishment of a new network communication association with the other terminal. A security information module may serve to collect and/or store information about available network communication associations between the first terminal and another terminal across different layers. The security information module may also assess a trust level for the network communication associations based on security mechanisms used to establish each association and/or past experience information reported for these network communication associations. Upon receiving a request for available network communication associations, the security information module provides this to the requesting application which can use it to establish communications with a corresponding application on the other terminal.

According to one example, an interface is provided (to a security information module) through which information for one or more (available) network communication associations for one or more layers is collected and distributed to applications. Information for the one or more (available) network communication associations may be collected and/or stored. Such information may include security information, trust level information, past experience information for the network communication associations. Security information for at least one network communication association is provided to a requesting application to allow the requesting application to select a network communication association to send data to a receiving terminal, thereby avoiding the establishment of a new network communication association with the receiving terminal.

In one example, a system and method are provided for facilitating security information to a second layer application to facilitate secure communications over first layer network communication associations, thereby avoiding the establishment of second layer network communication associations. In some instances, an application or service (e.g., banking services, etc.) may not trust other applications/services in the same device and, consequently, it may wish to establish its own secure communication channel or channel. However, in other instances a second layer application or service does not need protection from other applications/services in the same device (i.e., there is a trust with other application/services within the same device) and, consequently, a separate secure channel or network communication association may be avoided and a same first layer channel or network communication association may be used. As a result, the cost of a key management protocol may be amortized over multiple secure channels or associations. For example, an application layer may benefit from the media access control (MAC) layer security instead of establishing its own secure association.

In avoiding the establishment of second layer network communication associations, the second layer application may determine a strength level for each of the network communication associations. Strength levels may be determined using the security information and level of trust information associated with the network communication associations. The level of trust information may be determined by applications using the security information and any other available information on the network communication associations. Once a strength level is determined, it may be compared to a set of policies, stored on a security information module in a device, to determine if an existing network communication channel/association may be utilized or if a new network communication channel/association should be acquired. The selected or obtained network communication association (or secure network channel) may then be used for the transmission of data to/from the device to another device.

Another feature provides a system and method for facilitating security information to a first layer application to provide secure communications over first layer network communication associations, thereby avoiding the establishment of additional first network communication associations.

The first layers of a network may have to protect headers that the second layers may not have protected. The headers may have been introduced between the first and second layers. For example, an IP level security mechanism may be available for headers between the application layer and the Transmission Control Protocol/Internet Protocol (TCP/IP) layer. However, the application layer may have already protected the data or payload so the IP layer may make a determination as to whether to protect the TCP header or whether the IP level security mechanism may protect the TCP header. In other words, if a second layer is using a first layer protocol, some of the headers between the layers may need protection by the first layers.

Note that, as used herein, the term "layer" refers to a hierarchical protocol architecture in which a collection of conceptually similar functions provide services to a layer above it and receives service from the layer below it. Consequently, second layers can build their associations or communication channels based on first layer associations or channels. The terms "second layer" and "first layer" merely denote different layers and do not imply or infer any particular layer. The terms "first" and "second" may alternatively be referred to as "lower" and "higher", respectively. The term "association" refers to an established relationship with another device, such as a communication channel between layers of two devices. The term "security protocol" refers to any protocol were some form of authentication and/or encryption is utilized in establishing an association or channel.

Sharing Communication Associations

FIG. 1 is a block diagram of a communication network 100 illustrating first layer network communication associations established during communication between a transmitting terminal 102 and a receiving terminal 104. The transmitting terminal 102 may be connected to a network 110, such as the Internet, via a first access node 106 (e.g., base station). When transmitting data to the receiving terminal 104, the transmitting terminal 102 may send the data to the first access node 106, which then transmits the data to a gateway 108 via the Internet 110. From the gateway 108, the data may be transmitted to a second access node 112, which may connect the receiving terminal 104 to the network 110. The second access node 112 may then transmit the data to the receiving terminal 104.

When communication between the transmitting terminal 102 and the receiving terminal 104 is initiated, one or more secure channels or network communication associations may be established between the nodes of the communication network 100. For example, a Media Access Control (MAC) layer security association 114 may be established between the transmitting terminal 102 and the first access node 106. An Internet Protocol Security (IP sec) layer association 116 may be established between the transmitting terminal 102 and the gateway 108. Alternatively, an IP sec layer 118 may be between the transmitting terminal 102 and the receiving terminal 104. Additionally, there may be application layer security associations, e.g. Transport Layer Security (TLS)/Datagram Transport Layer Security (DTLS) 120, between the transmitting terminal 102 and the receiving terminal 104.

Figure 2:
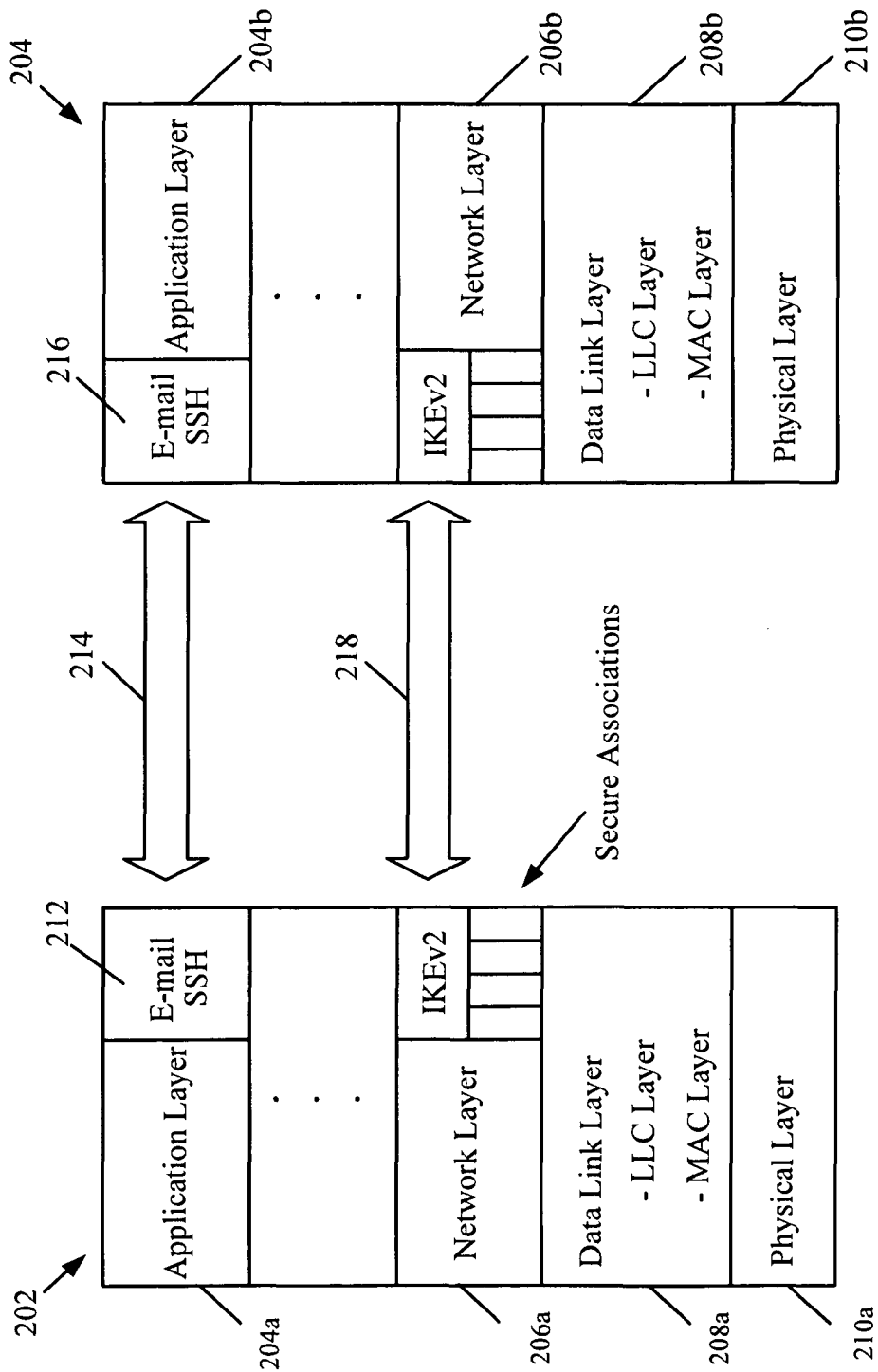
FIG. 2 is a block diagram illustrating network communication layer associations between a transmitting terminal and a receiving terminal.

FIG. 2 is a block diagram illustrating network communication layer associations between a transmitting terminal 202 and a receiving terminal 204. The network architecture of the devices, which may be, for example, the Open Systems Interconnection (OSI) Seven Layer Model, may be divided into seven layers which, from top to bottom, are the Application, Presentation, Session, Transport, Network, Data-Link, and Physical Layers. Note that, for simplicity and clarity, only the Application layer 204a and 204b, Network layer 206a and 206b, Data-Link layer 209a and 208b and Physical layer 210a and 210b of each device are illustrated.

In the example shown in FIG. 2, a first email application 212 may seek to establish a secure channel to protect transmissions to/from a second email application 216. As such, the first email application 212, operating in the application layer 204a of the transmitting terminal 202, may use a network protocol Secure Shell (SSH) to exchange data, over a secure network communication association (or channel) 214, with the second email application 216 in the application layer 204b of the receiving terminal 204.

Also shown in the example in FIG. 2 is the use of an Internet Key Exchange version 2 (IKEv2) protocol. In the network layer 206a, the transmitting terminal 202 may use the IKEv2 protocol to negotiate a secure association 218, with the receiving terminal 204, at the outset of an IPsec session. In one example, rather than establishing its own secure association (i.e., channel), the first email application 212 may utilize one of the pre-established secure associations 218 in Network layer 206a. A security information module may provide information about first layer associations or channels to second layers. In some implementations, a vertical sharing of network communication associations occurs among different layers. However, in other implementations, horizontal sharing of network communication associations may occur from one application in a first layer to another application or service in the same first layer.

Figure 3A:
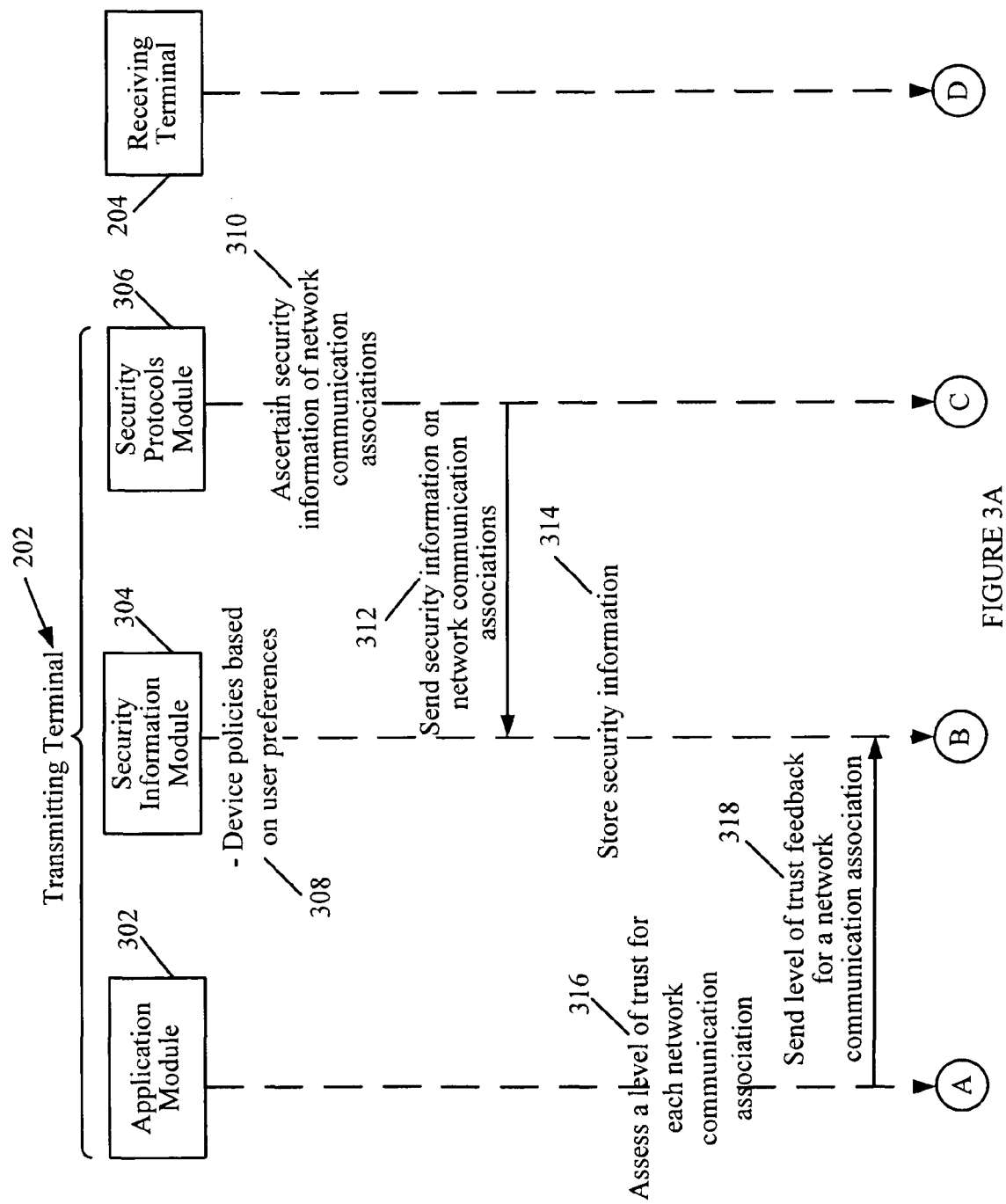
FIG. 3 (comprising FIGS. 3A, 3B and 3C) is a flow diagram illustrating a method for providing security and level of trust information to a second layer application to facilitate secure communications over first layer network communication associations, thereby avoiding the establishment of second layer network communication associations.
Figure 3B:
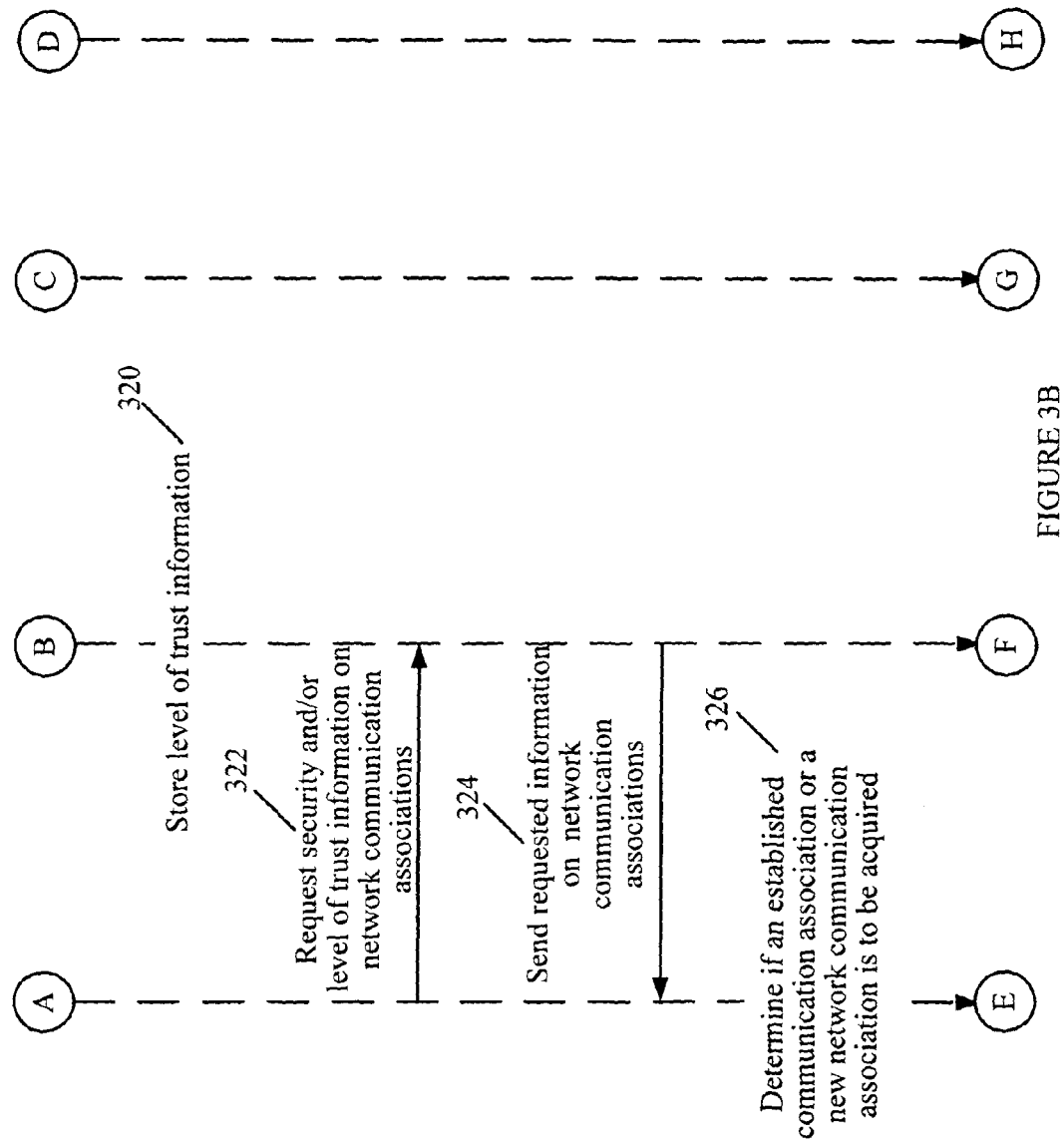
Figure 3C:
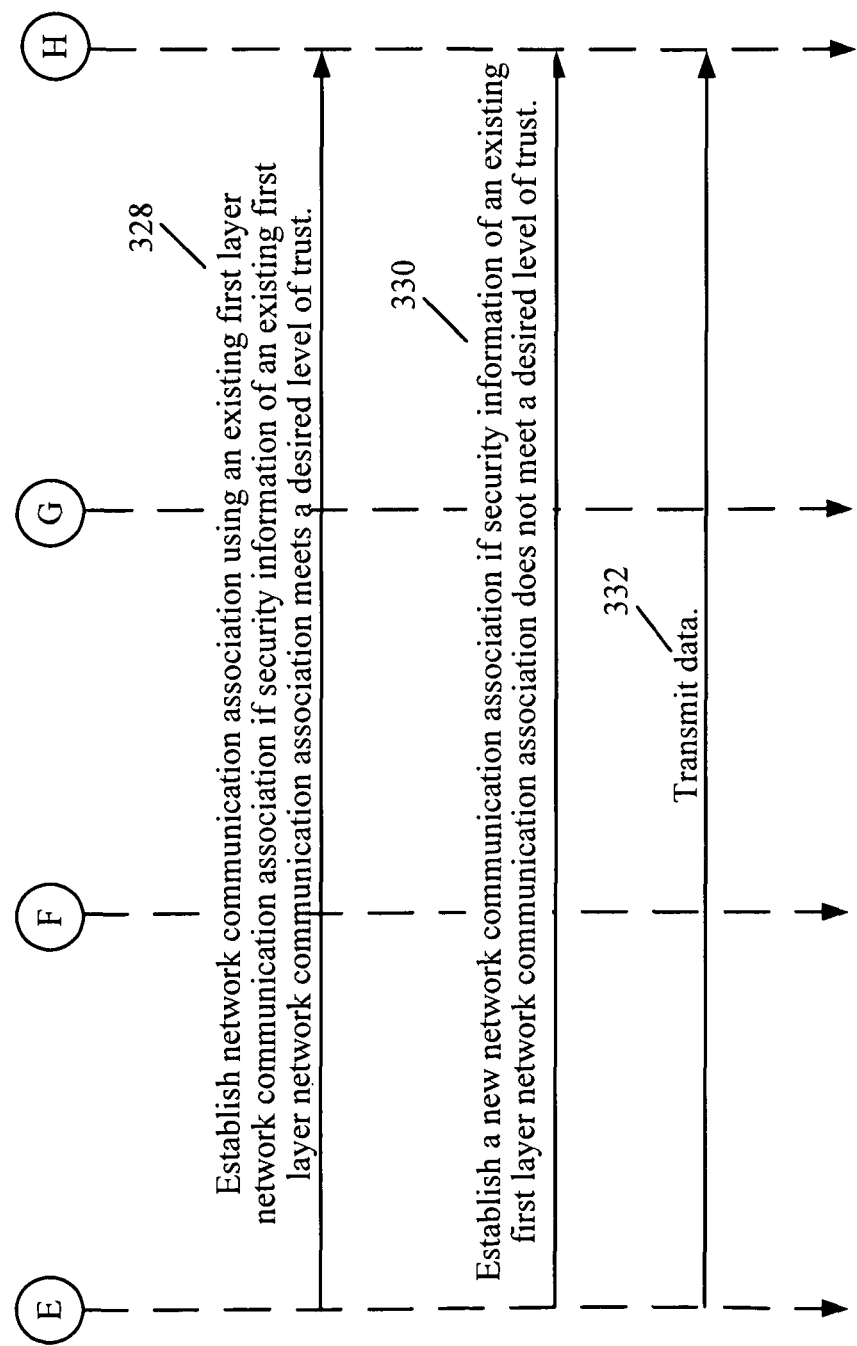

FIG. 3 (comprising FIGS. 3A, 3B and 3C) is a flow diagram illustrating a method for facilitating secure transmission of data between two devices, or terminals, using network communication associations for a first layer. By using first layer network communication associations, the use and establishment of new network communication associations on a second layer may be avoided. In this example, the transmitting terminal 202 and receiving terminal 204 of FIG. 2 are used for illustration purposes. The transmitting terminal 202 may include an application module 302, a security information module 304 and a security protocols module 306.

The application module 302 may include applications or services that use network communication associations to exchange data with other applications on other terminals or devices. Additionally, as discussed below, the application module 302 may also assess a level of trust for the nodes or network communication associations after an exchange of data or an attempt to exchange data. The level of trust may be assessed using information such as the type of authentication used in the creation of the network communication association. For example, the level of trust may be determined based on whether strong pre-shared keys (PSKs) or self-signed certificates or unauthenticated Diffie-Hellman were used in creating the network communication association. This information may be provided to the security protocol module via an application program interface (API).

The Security Information Module 304 may collect information about the nature of secure channels or network communication associations from various security protocols and provide this security information to applications or services when requested. Additionally, the Security Information Module 304 may collect the information on the level of trust for nodes and network communication associations provided by applications. The level of trust information may be incorporated into decisions as to which network communication association to use in future communications or may be provided to other modules for making routing decisions. By knowing the type of network communication association, information about the type of credentials or authentication mechanisms used in the creation of such associations may be used to assess a level of trust for such association and/or corresponding node. For example, the network communication associations may include IKEv2 and 802.11i or a Bluetooth pairing scheme, each of which may result in a different level of trust for the network communication association.

The security protocols module 306 may include any security protocol or network communication association, either first or second layer, which facilitates credential management, key management and/or secure channel establishment for communicating between a transmitting terminal and a receiving terminal.

In a communication network, a set of policies may be established by the transmitting terminal 202 and may be stored in the Security Information Module 304, where the set of policies may be based on preferences of users 308. The preferences may include, but are not limited to cost, available bandwidth and security level that an application may use to transmit data securely. The Security Information Module 304 may collect this information and use this to interact with applications and/or network communication associations.

The Security Protocols Module 306 may ascertain security information on the network communication associations which may have previously been established between an application/service or application program interface (API) on the transmitting terminal and the receiving terminal 310. Applications or services may be able to use this security information to select a previously established first layer network communication association to minimize overhead as overhead may not be wasted in establishing a network communication association that may have already been established. For example, the Security Information Module may have knowledge of the availability of encrypted network communication associations or channels. As a result, an application can use the first layer encrypted network communication associations or channels and skip its own IP layer encryption. Whereas if this level of information was not available, the application may have to establish its own IP layer encryption even though this model of direct connectivity was available at a first layer. Consequently, second layer applications or services can reduce overhead and/or complexity by relying on first layer associations or channels (have desired security levels) by obtaining this information from the security information module 304.

The security information for a particular association or channel may include the type of available credentials with a given node over a particular channel, including but not limited to user-involved Bluetooth pairing and infrastructure assisted Extensible Authentication Protocol (EAP). The credentials may be association or channel independent. In addition to the type of available credentials, the security information may also include how the node or association/channel was authenticated, such as PSKs, self-signed certificates, biometrics, etc., and the type of device/node, i.e. trusted versus non-trusted, if known. This information may be sent to the security information module 312 where it may be stored 314.

Next, the Application Module 302 may assess a level of trust for each of the network communication associations 316. The level of trust may be assessed using the security information obtained and any other information it may have on the network communication associations, for example, information provided by users. For instance, an application that receives a corrupt file may indicate that it has received a corrupt file from the device or node from which it received the corrupt file. This information may be used in assessing the level of trust. Next, a level of trust feedback may be provided to the Security Information Module 318 where it may be stored 320. The level of trust feedback may be used by other applications to determine if a particular network communication association or node may be trusted (or to assign it a level of trust).

Additionally, the level of trust information may be used to calculate the overall strength of a network communication association. This information may be useful for other applications or services running on the device/node. For example, another application looking to obtain a piece of software may choose not to use the device/node that previously provided a corrupt file according to the feedback. Even if the level of authentication may be acceptable to an application, the prior history of the corresponding node or network authentication association indicating a low trust level (e.g., history of providing corrupt files, etc.) may supersede such channel strength information. For example, if an application in Device C has the option of obtaining content from Device A or Device B and the application has prior knowledge of Device A, the application may be better able to authenticate the content coming from Device A than if it came from Device B. Even if both Device A and Device B used self-signed certification/authentication, the application may request to receive the information from Device A as the application has a prior established relationship with Device A. Consequently, the prior history of positive communications with Device A (by the same or other applications operating in Device C) may be used by an application to determine whether such association should be used.

When an application in the transmitting terminal 202 wants to transmit data to the receiving terminal 204, the Application Module 302 (e.g., an application or service operating on the transmitting terminal 202) may request any available security and level of trust information for first layer network communication associations or channels that may be available or stored in the security information module 322. The security information module 304 may receive this request and may send any available security and level of trust information to the application module 324. The security information may include, for example, the authentication strength and Crypto Algorithm strength of the network communication associations. The application module 302 may then use the security and level of trust information, along with the set of policies, to determine whether or not an existing network communication association or channel may be utilized or if a new network communication association or channel should be acquired 326. In other words, the security and/or level of trust information may be used to determine a security level while the set of policies may include the desired security level for data transmission from the device. If the security level determined using the security and level of trust information either equals or exceeds the desired level of security, a first layer network communication may be used. The desired security level may be determined by the application based on the type of security preferred. For example, the application may want to use integrity and encryption or encryption with a 256-bit key.

If the application module determines that any of the established network communication associations may be utilized, i.e. meets a desired security level, the application running on the transmitting terminal may select one of the first layer network communication associations through which to communicate with the receiving terminal 326.

In some instances, first layer network communication associations may be shared among a plurality of applications or services. In such instance, the applications or services may have sufficient trust on other applications or services to concurrently use the same first layer shared association or channel.

In other instances, an application or service may not trust other applications or services in the same device or may wish to use a non-shared private or dedicated association or channel for its communications. In such instances, the application or service may either request that the first layer set up a non-shared network communication association or channel for its sole use, or may decide to setup its own second layer association or channel.

Once a first layer network communication association or channel has been selected, notification may then be provided to the receiving terminal 204 as to the network communication association and a secure communication channel may be established with the receiving terminal 328. If all of the established network communication associations fail to meet a desired security level, a new network communication association with the desired security level may be created 330. Notification may then be provided to the receiving terminal as to the new network communication association. Once the transmitting terminal has established the secure communication channel, either using an existing first layer network communication association or creating a new network communication association, data is transmitted to the receiving terminal 204 over the secure communication channel 332.

Figure 4:
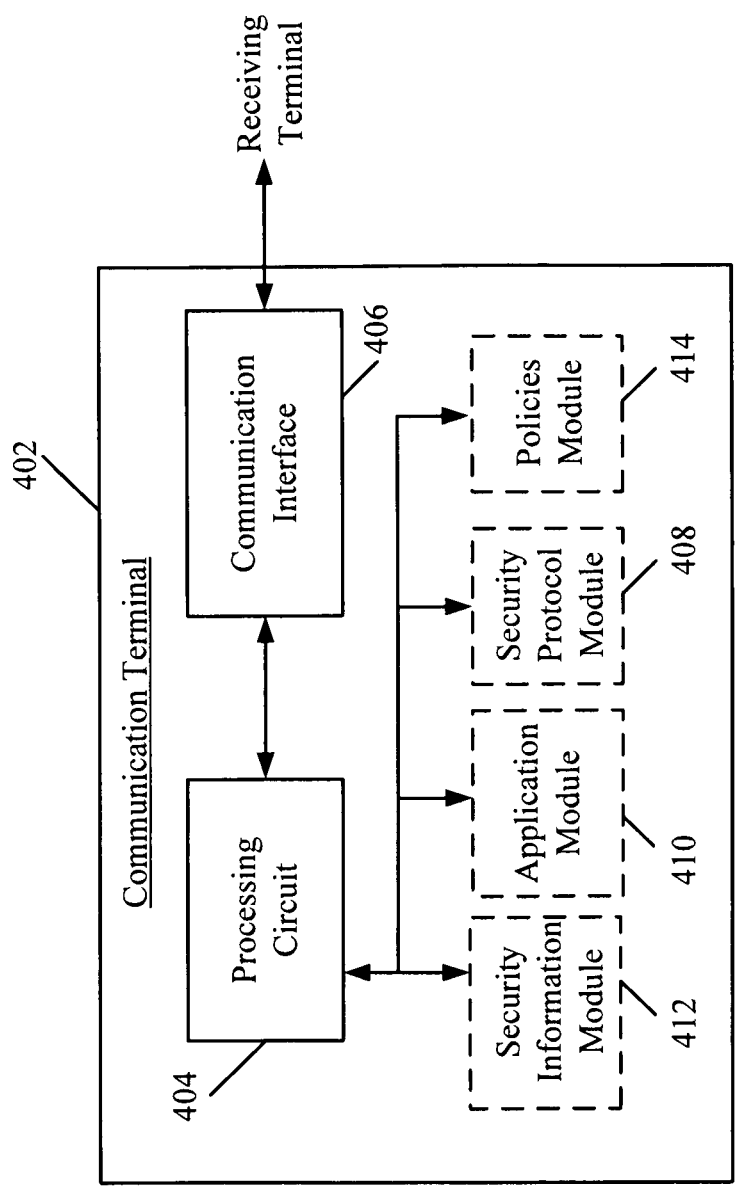
FIG. 4 is a block diagram illustrating an example of an access terminal that may be configured to ascertain security and level of trust information of first layer network communication associations.

FIG. 4 is a block diagram illustrating an example of a communication terminal that may be configured to provide security information to a second layer application to facilitate secure communications over first layer network communication associations, thereby avoiding the establishment of second layer network communication associations. The communication terminal 402 may include a processing circuit 404 coupled to a communication interface 406 for communicating with another device over a wired or wireless network. An application module 410 may be implemented as hardware, software (e.g., operating within the processing circuit 404), or a combination thereof, and represents applications or services that use a secure channel or association established by a security protocol to exchange data. The application module 410 may provide information about the rating (e.g., trust level, etc.) of a certain node or path to the security information module 412. The application module 410 may assess a level of trust to each of the network communication associations. The security information module 412 may be implemented as hardware, software (e.g., operating within the processing circuit 404), or a combination thereof, to collect information about the nature of the secure associations or channels from various security protocols and provides it to the applications (e.g., application module 410) as requested. The security information module 412 may also collect ratings information provided by the applications and incorporates such feedback into decisions on whether to use a particular secure association or channel or provides it to other modules for routing decisions. A security protocol module 408 may be implemented as hardware, software (e.g., operating within the processing circuit), or a combination thereof, to establish secure associations or channels and may provide information about the type of credentials or authentication mechanisms used in the creation of network communication associations/channels. A policies module 414 may serve to store a set of policies which may be used as guidelines for selecting the network communication association on which to transmit data.

The communication terminal 402 of FIG. 4 may be configured to provide security information to a first layer application to facilitate secure communications over first layer network communication associations, thereby avoiding the establishment of another first layer network communication association. That is, rather than relying on network communication associations on other layers (e.g., vertical sharing), an application may use a network communication association on the same layer (horizontal sharing).

Figure 5:
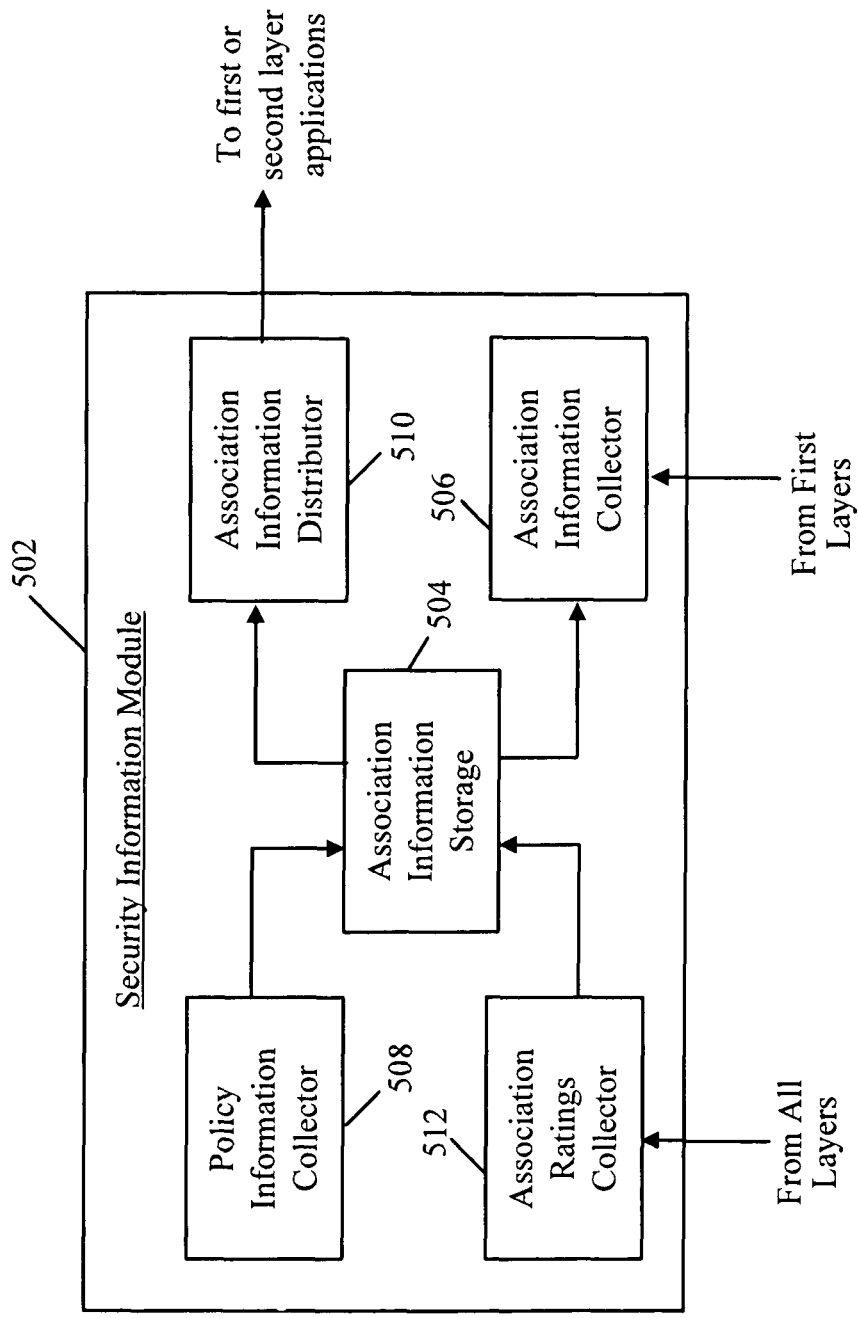
FIG. 5 is a block diagram illustrating the operation and/or functions of a security information module to collect first layer association (channel) information and provide it to first or second layer applications and/or services.

FIG. 5 is a block diagram illustrating the operation and/or functions of a security information module to collect first layer association (channel) information and provide it to first or second layer applications and/or services. The security information module 502 may include various modules to collect and distribute information for network communication associations or channels available at various layers of a device in which the security information module 502 operates. An association information storage module 504 may store information related to the network communication associations or channels available at various layers (e.g., security level, trust level, strength level, prior ratings, policies, etc.). An association (channel) information collector 506 may serve to collect information about the available associations or channels at various layers. For example, the association information collector 506 may inquire and/or obtain the network associations and/or channels that are available at various layers, the type of authentication used to create each of those associations or channels, etc. Such information may be obtained, for example, via an application programming interface (API) for the security protocols that may allow new associations to provide information to the security information module 502. Examples of data collected from security protocols include: a) type of available credentials established with a given node (another device) over a given association or channel (e.g., user involved Bluetooth pairing, infrastructure assisted EAP, etc.); b) type of credentials used for authenticating the association or channel (e.g., PSK, self-signed certificates, biometrics, etc.); and/or c) type of device/node with which an association is established (e.g., trusted or untrusted device, etc.).

Additionally, a policy information collector 508 may obtain or store defined rules for the associations and/or protocols. For example, depending on the policy information available, the policy information collector 508 may provide input to security protocols on whether or not an authentication needs to be established for a particular association or channel. A device may have a set of policies based on user preferences, such as cost preferences, level of security required, etc. This information may be used by the security information module to interact with applications and security protocols.

An association information distributor 510 may serve to provide information to first or second layer applications and services. For example, the association information distributor 510 may provide a) the strength of the available secure channel or association to a given node or device, b) the available secure paths to a given node and relative strengths, the available nodes for a given service with secure channel availability. Applications may register with the security information module 502 to receive such information. The granularity or detail of information provided for any one layer or protocol may vary.

An association ratings collector 512 allows applications and/or services to provide feedback about particular associations, channels, and/or nodes. For example, an application may provide ratings of nodes based on past experience with such node (e.g., if a corrupt file is received from such node, this may equate to a low rating for that node). Ratings may be used to calculate the overall strength of a secure channel or node. This information may then be useful to other applications and services.

Figure 6:
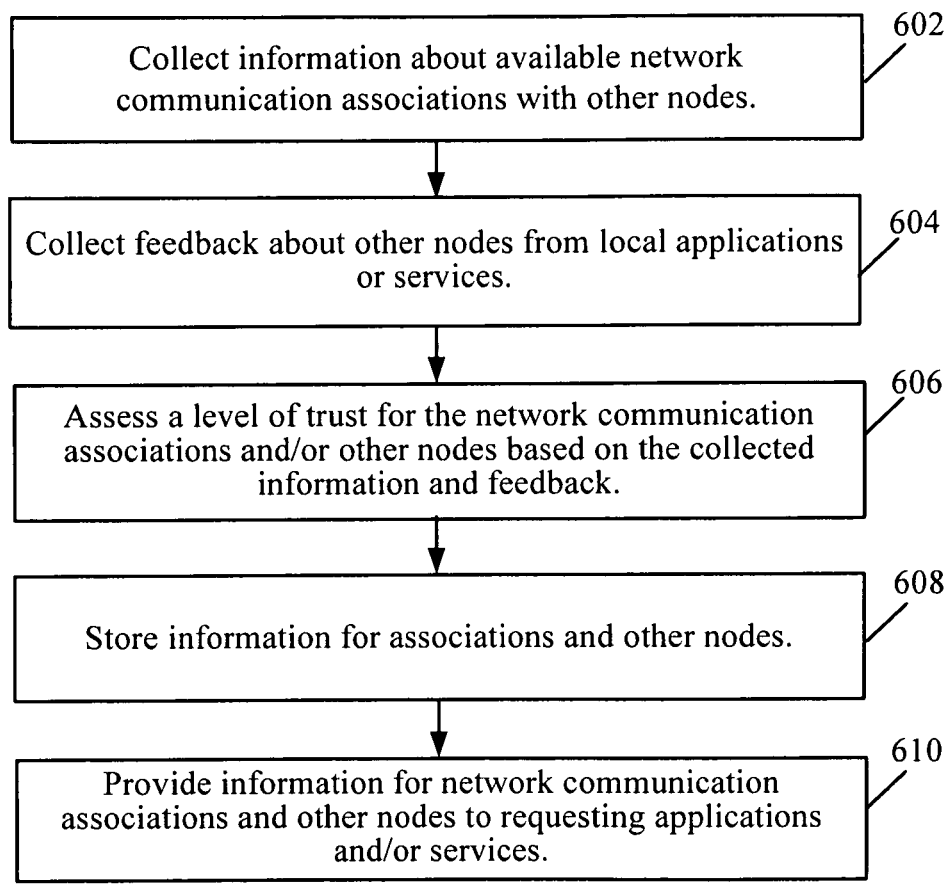
FIG. 6 illustrates a method operational in a security information module for collecting and providing network communication information to applications and/or services.

FIG. 6 illustrates a method operational in a security information module for collecting and providing network communication information to applications and/or services. Such security information module may be implemented as software, hardware, and/or a combination thereof. Information about available first layer network communication associations with other nodes is collected 602. Similarly, feedback about other nodes from local applications or services is also collected 604. Such feedback may indicate whether such other nodes (i.e., other devices with which an application has communicated) are trustworthy. A level of trust for the first layer network communication associations and/or other nodes may be assessed based on the collected information and feedback 606. Information for associations and other nodes may be stored or maintained by the security information module 608. Information for network communication associations and other nodes may be provided to requesting applications and/or services 610.

Figure 7A:
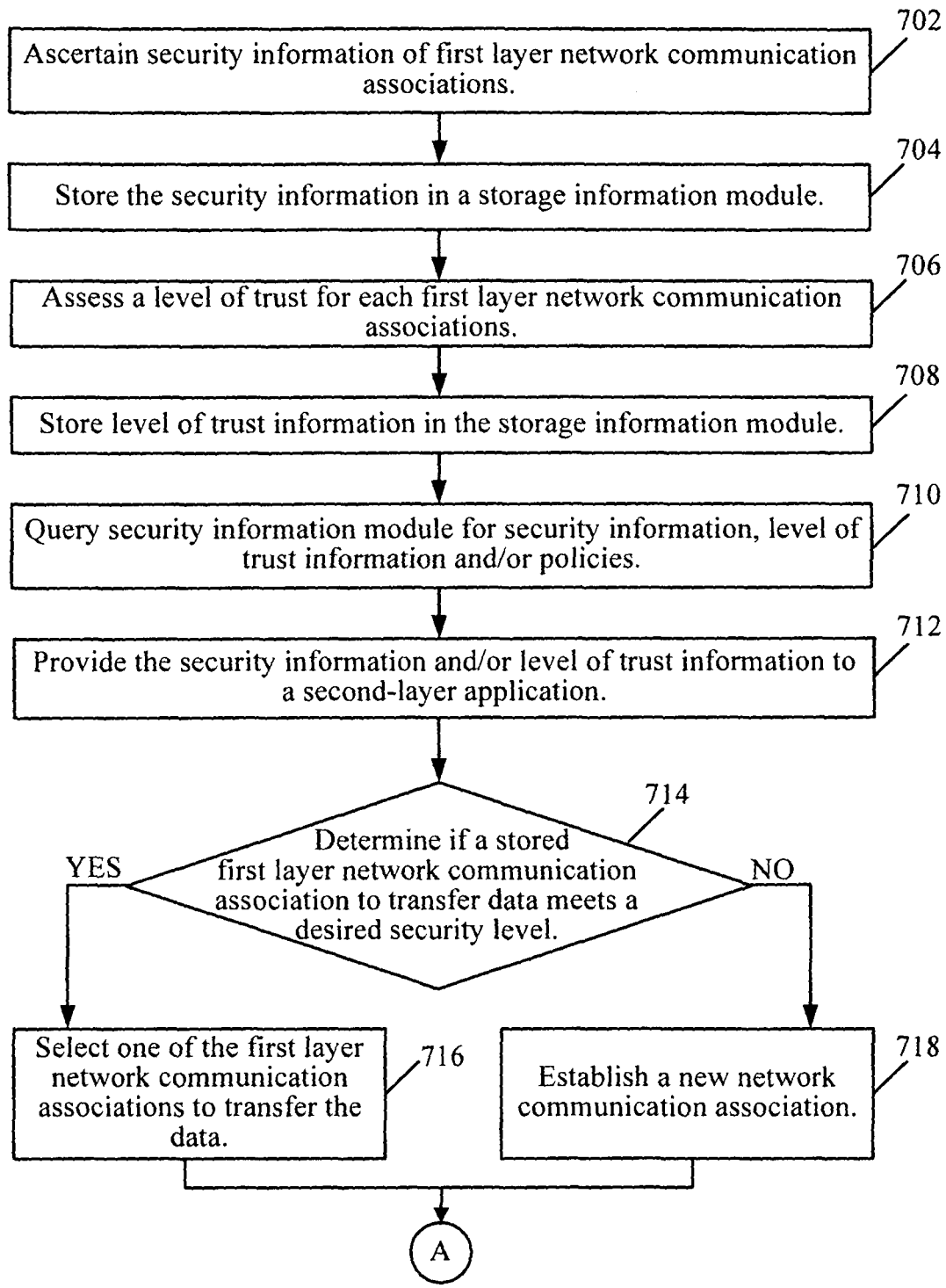
FIG. 7 (comprising FIGS. 7A and 7B) illustrates a method operational in a communication terminal for providing security and level of trust information to a second layer application to facilitate secure communications over first layer network communication associations, thereby avoiding the establishment of second layer network communication associations.
Figure 7B:
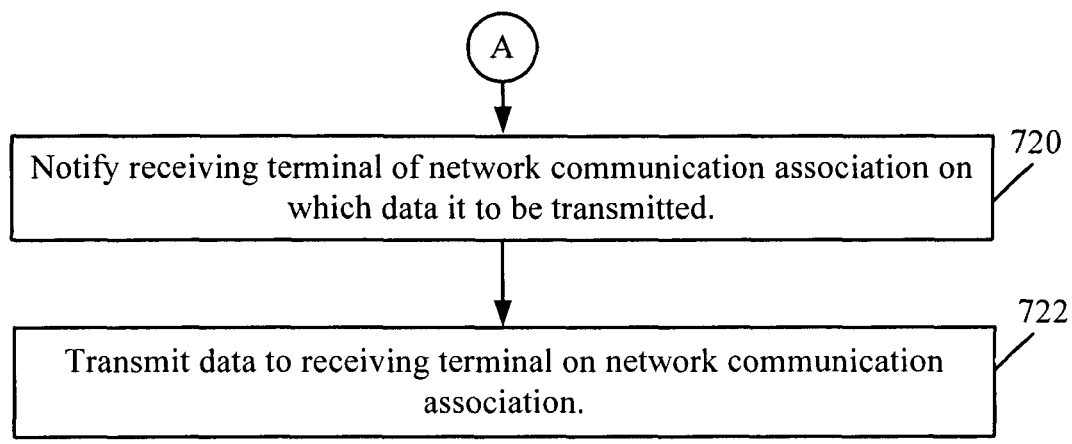

FIG. 7 illustrates a method operational in an access terminal for providing information about network communication associations to facilitate secure communications over one of the network communication associations, thereby avoiding the establishment a new network communication association. To accomplish this, a security information module (e.g., hardware, software, or combination thereof) provides an interface through which information for one or more network communication associations for one or more layers is collected and/or distributed to applications. In one example, the one or more network communication associations may correspond to one or more layers of an Open Systems Interconnection (OSI) module communication system, where the one or more layers may include at least one of an application layer, a network layer, a data link layer and a physical layer.

The security information module may ascertain or obtain and/or store security information for network communication associations 702 and 704 from one or more layers. The security information of the network communication associations may include at least one of: a method used to secure the first layer network communication association, a method used to authenticate the first layer network communication association, and a prior history between the transmitting terminal and the receiving terminal with which the network communication associations are established. The security information may also include a level of strength for the network communication associations. A level of trust may be assessed and/or stored for each of the one or more network communication associations 706 and 708. Additionally, information from applications regarding previous experiences with one or more receiving terminals may be collected and provided to other applications. A level of trust may be assessed for each such receiving terminal based on the collected information. The level of trust may be based on previous experiences with a corresponding receiving terminal and type of authentication used to create the layer network communication association to the corresponding receiving terminal. A set of policies may also be identified and/or collected to be used in selecting a network communication association through which to send the data, wherein the set of policies is based on user preferences 710. The collected information may be stored in a security information module for later retrieval and selection of a network communication association on which to send the data to an application on the receiving terminal.

A request may be received from a requesting application for information about available network communication associations 712.

In response to such request, a determination may be made (e.g., by either the requesting terminal or the secure information module) as to whether a stored network communication association to transfer data meets a desired security level 714. In response to such request, a network communication association may be selected on which the requesting application can send the data to the receiving terminal over a network. According to one option, if a security level of at least one of the one or more network communication association meets a desired security level for data transmissions by the requesting application, security information for at least one network communication association may be provided to the requesting application to allow the requesting application to select a network communication association to send data to a receiving terminal, thereby avoiding the establishment of a new network communication association with the receiving terminal 716. Alternatively, a new network communication association may be established which the requesting application can use to send the data to the receiving terminal if security levels of the one or more network communication associations fail to meet a desired security level 718. In one example, the security information module may select the network communication association that the requesting application should use and provides that network communication association to the requesting application. In another example, the requesting application may receive a plurality of network communication associations from the security information module and then chooses one for transmission to the receiving terminal. Upon selecting a network communication association, the receiving terminal may be notified of the network communication association on which to receive data being sent 720.

Data may then be transmitted (e.g., by the requesting application) to the receiving terminal on the selected network communication association 722.

In one example, the requesting application may operate on a first layer and the selected network communication association may operate on a different second layer. The first layer may be a higher layer than the second layer. In another example, the requesting application may operate on a first layer and the selected network communication association may operate on the same first layer.

According to yet another configuration, a circuit is adapted to provide an interface through which information for one or more network communication associations for one or more layers is collected and distributed to applications. The same circuit, a different circuit, or a second section of the same or different circuit may be adapted to ascertain, collect, and/or store information for one or more network communication associations on one or more layers. For example, such circuit may assess and/or store a level of trust and/or security information for each of the one or more network communication associations. In addition, the same circuit, a different circuit, or a third section may be adapted to assess, collect, and/or information from applications regarding previous experiences with one or more receiving terminals. Such information may include a level of trust for each such receiving terminal based on the collected information. Similarly, the same circuit, a different circuit, or a fourth section may be adapted to receive a request from a requesting terminal for information about available network communication associations. The same circuit, a different circuit, or a fifth section may be adapted to select a network communication association on which the requesting terminal can send data to the receiving terminal over a network. The same circuit, a different circuit, or a sixth section may be adapted to providing security information for at least one network communication association to a requesting application to allow the requesting application to select a network. The same circuit, a different circuit, or a seventh section may be adapted to establish a new network communication association and using it to send the data to the receiving terminal if security levels of the one or more network communication associations fail to meet a desired security level.

One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise random access memory (RAM), read-only memory (ROM), Electrically Erasable Programmable Read-Only Memory (EEPROM), Compact Disc read-only memory (CD-ROM) or other optical disk storage, magnetic disk storage, flash memory or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The transmission techniques described herein may also be used for various wireless communication systems such as a code division multiple access (CDMA) system, a time division multiple access (TDMA) system, a frequency division multiple access (FDMA) system, an orthogonal frequency division multiple access (OFDMA) system, a single carrier FDMA (SC-FDMA) system, and so on. An OFDMA system utilizes orthogonal frequency division multiplexing (OFDM), which is a modulation technique that partitions the overall system bandwidth into multiple (K) orthogonal subcarriers. These subcarriers are also called tones, bins, and so on. With OFDM, each subcarrier may be independently modulated with data. An SC-FDMA system may utilize interleaved FDMA (IFDMA) to transmit on subcarriers that are distributed across the system bandwidth, localized FDMA (LFDMA) to transmit on a block of adjacent subcarriers, or enhanced FDMA (EFDMA) to transmit on multiple blocks of adjacent subcarriers. In general, modulation symbols are sent in the frequency domain with OFDM and in the time domain with SC-FDMA.

One or more of the components, steps, and/or functions illustrated in FIGS. 1, 2, 3, 4, 5, 6 and/or 7 may be rearranged and/or combined into a single component, step, or function or embodied in several components, steps, or functions. Additional elements, components, steps, and/or functions may also be added. The apparatus, devices, and/or components illustrated in FIGS. 1, 2, 4 and/or 5 may be configured or adapted to perform one or more of the methods, features, or steps described in FIGS. 3, 6, and/or 7. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, system and method for providing security information to a second layer application to facilitate secure communications over first layer network communication associations, thereby avoiding the establishment of second layer network communication associations may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

The invention claimed is:

1. A method operational on a transmitting terminal, the method comprising:
    collecting security information for one or more network communication associations across one or more layers distinct from an application layer, the one or more network communication associations having been previously established with one or more receiving terminals;
    collecting feedback information from one or more applications regarding a history of positive or negative communications with the one or more receiving terminals;
    assessing level of trust information for at least one of the one or more network communication associations based on the feedback information, wherein the level of trust information is based on a type of authentication used to create the one or more network communication associations previously established with the one or more receiving terminals;
    determining a level of strength information for the one or more network communication associations based on the security information and the level of trust information; and
    providing the security information, the level of trust information, and the level of strength information to a requesting application of the transmitting terminal, the requesting application configured to:
        (a) compare the level of strength information to a set of policies and select a secure network communication association, from the one or more network communication associations, to send data to a receiving terminal if a desired security level is met based on the security information, the level of trust information, and the comparison, and (b) establish a secure network communication association if the requesting application determines that security levels of the one or more network communication associations fail to meet a desired security level.

2. The method of claim 1, further comprising:
storing the collected security information and the level of trust information in a security information module for later retrieval and selection of the secure network communication association on which to send the data to an application on the receiving terminal.

3. The method of claim 1, wherein the one or more network communication associations correspond to one or more layers of an Open Systems Interconnection (OSI) module communication system, the one or more layers including at least one of a network layer, a data link layer and a physical layer.

4. The method of claim 1, wherein the secure network communication association is selected from the one or more network communication associations after the requesting application determines that one or more of the network communication associations meets a desired security level.

5. The method of claim 4, wherein the secure network communication association operates on a first layer of a hierarchical protocol architecture, and selecting the first layer secure network communication association to send the data to the receiving terminal avoids the establishment of a new network communication association with the receiving terminal that operates on a second layer of the hierarchical protocol architecture, the second layer being a higher layer than the first layer.

6. The method of claim 1, further comprising:
identifying a set of policies to be used in selecting the secure network communication association through which to send the data, wherein the set of policies is based on user preferences.

7. The method of claim 1, further comprising:
receiving a request from the requesting application for the security information about the one or more network communication associations.

8. The method of claim 1, wherein the security information of the network communication associations include at least one of: a method used to secure the first layer network communication association, a method used to authenticate the first layer network communication association, and a prior history between the transmitting terminal and the receiving terminal with which the network communication associations are previously established.

9. The method of claim 1, wherein the secure network communication association operates on a first layer of a hierarchical protocol architecture and the requesting application operates on a second layer of the hierarchical protocol architecture that is a higher layer than the first layer.

10. The method of claim 1, wherein the requesting application operates on a first layer of a hierarchical protocol architecture and the secure network communication association operates on the same first layer.

11. The method of claim 1, wherein the security information is collected through an application programming interface (API) of the transmitting terminal.

12. The method of claim 1, wherein the security information includes at least one of: (a) a type of available credentials with one or more of the receiving terminals over a particular channel; (b) how the one or more network communication associations were authenticated; and/or (c) trust information that indicates whether the one or more receiving terminals are trusted or non-trusted.

13. The method of claim 1, wherein the one or more network communication associations operate on a first layer of a hierarchical protocol architecture, and the newly established network communication association operates on a second layer of the hierarchical protocol architecture that is a higher layer than the first layer.

14. The method of claim 1, wherein the negative communications with the one or more receiving terminals include at least one communication of a corrupt file.

15. An access terminal, comprising:
a communication interface for communication with a receiving terminal;
a processing circuit coupled to the communication interface, the processing circuit configured to:
collect security information for one or more network communication associations across one or more layers distinct from an application layer, the one or more network communication associations having been previously established with one or more receiving terminals;
collect feedback information from one or more applications regarding a history of positive or negative communications with the one or more receiving terminals;
assess level of trust information for at least one of the one or more network communication associations based on the feedback information, wherein the level of trust information is based on a type of authentication used to create the one or more network communication associations previously established with the one or more receiving terminals;
determine a level of strength information for the one or more network communication associations based on the security information and the level of trust information; and
provide the security information, the level of trust information, and the level of strength information to a requesting application of the access terminal, the requesting application configured to:
(a) compare the level of strength information to a set of policies and select a secure network communication association, from the one or more network communication associations, to send data to the receiving terminal if a desired security level is met based on the security information, the level of trust information, and the comparison, and
(b) establish a secure network communication association if the requesting application determines that security levels of the one or more network communication associations fail to meet a desired security level.

16. The terminal of claim 15, further comprising:
a storage device coupled to the processing circuit and configured to store the collected security information and the level of trust information in a security information module for later retrieval and selection of the secure network communication association on which to send the data to an application on the receiving terminal.

17. The terminal of claim 15, wherein the secure network communication association is selected from the one or more network communication associations after the requesting application determines that one or more of the network communication associations meets a desired security level.

18. The terminal of claim 17, wherein the secure network communication association operates on a first layer of a hierarchical protocol architecture, and selecting the first layer secure network communication association to send the data to the receiving terminal avoids the establishment of a new network communication association with the receiving terminal that operates on a second layer of the hierarchical protocol architecture, the second layer being a higher layer than the first layer.

19. The terminal of claim 15, wherein the secure network communication association is a newly established network communication association after the requesting application determines that security levels of the one or more network communication associations fail to meet a desired security level.

20. The terminal of claim 19, wherein the one or more network communication associations operate on a first layer of a hierarchical protocol architecture, and the newly established network communication association operates on a second layer of the hierarchical protocol architecture that is a higher layer than the first layer.

21. The terminal of claim 15, wherein the processing circuit is further configured to:
receive a request from the requesting application for the security information about the one or more network communication associations.

22. The terminal of claim 15, wherein the secure network communication association operates on a first layer of a hierarchical protocol architecture and the requesting application operates on a second layer of the hierarchical protocol architecture that is a higher layer than the first layer.

23. The terminal of claim 15, wherein the requesting application operates on a first layer of a hierarchical protocol architecture and the secure network communication association operates on the same first layer.

24. An access terminal, comprising:
means for collecting security information for one or more network communication associations across one or more layers distinct from an application layer, the one or more network communication associations having been previously established with one or more receiving terminals;
means for collecting feedback information from one or more applications regarding a history of positive or negative communications with the one or more receiving terminals;
means for assessing level of trust information for at least one of the one or more network communication associations based on the feedback information, wherein the level of trust information is based on a type of authentication used to create the one or more network communication associations previously established with the one or more receiving terminals;
means for determining a level of strength information for the one or more network communication associations based on the security information and the level of trust information; and
means for providing the security information, the level of trust information, and the level of strength information to a requesting application of the access terminal, the requesting application configured to:
(a) compare the level of strength information to a set of policies and select a secure network communication association, from the one or more network communication associations, to send data to a receiving terminal if a desired security level is met based on the security information, the level of trust information, and the comparison, and
(b) establish a secure network communication association if the requesting application determines that security levels of the one or more network communication associations fail to meet a desired security level.

25. The terminal of claim 24, wherein the secure network communication association is selected from the one or more network communication associations after the requesting application determines that one or more of the network communication associations meets a desired security level.

26. The terminal of claim 24, wherein the secure network communication association is a newly established network communication association after the requesting application determines that security levels of the one or more network communication associations fail to meet a desired security level.

27. The terminal of claim 24, wherein the secure network communication association operates on a first layer of a hierarchical protocol architecture and the requesting application operates on a second layer of the hierarchical protocol architecture that is a higher layer than the first layer.

28. The terminal of claim 24, wherein the requesting application operates on a first layer of a hierarchical protocol architecture and the secure network communication association operates on the same first layer.

29. A processor comprising:
a processing circuit configured to:
collect security information for one or more network communication associations across one or more layers distinct from an application layer, the one or more network communication associations having been previously established with one or more receiving terminals;
collect feedback information from one or more applications regarding a history of positive or negative communications with the one or more receiving terminals;
assess level of trust information for at least one of the one or more network communication associations based on the feedback information, wherein the level of trust information is based on a type of authentication used to create the one or more network communication associations previously established with the one or more receiving terminals;
determine a level of strength information for the one or more network communication associations based on the security information and the level of trust information; and
provide the security information, the level of trust information, and the level of strength information to a requesting application of a transmitting terminal, the requesting application configured to:
(a) compare the level of strength information to a set of policies and select a secure network communication association, from the one or more network communication associations, to send data to a receiving terminal if a desired security level is met based on the security information, the level of trust information, and the comparison, and
(b) establish a secure network communication association if the requesting application determines that security levels of the one or more network communication associations fail to meet a desired security level.

30. A non-transitory computer-readable storage medium comprising instructions for facilitating use of pre-established network communication associations to send data from an access terminal, the instructions which when executed by a processor causes the processor to:
- collect security information for one or more network communication associations across one or more layers distinct from an application layer, the one or more network communication associations having been previously established with one or more receiving terminals;
- collect feedback information from one or more applications regarding a history of positive or negative communications with the one or more receiving terminals;
- assess level of trust information for at least one of the one or more network communication associations based on the feedback information, wherein the level of trust information is based on a type of authentication used to create the one or more network communication associations previously established with the one or more receiving terminals;
- determine a level of strength information for the one or more network communication associations based on the security information and the level of trust information; and
- provide the security information, the level of trust information, and the level of strength information to a requesting application of the access terminal, the requesting application configured to:
  - (a) compare the level of strength information to a set of policies and select a secure network communication association, from the one or more network communication associations, to send data to a receiving terminal if a desired security level is met based on the security information, the level of trust information, and the comparison, and
  - (b) establish a secure network communication association if the requesting application determines that security levels of the one or more network communication associations fail to meet a desired security level.

* * * * *